Dec. 11, 1923.
C. C. FARMER
1,477,215
SPEED GOVERNING SWITCH DEVICE
Filed Feb. 7, 1921
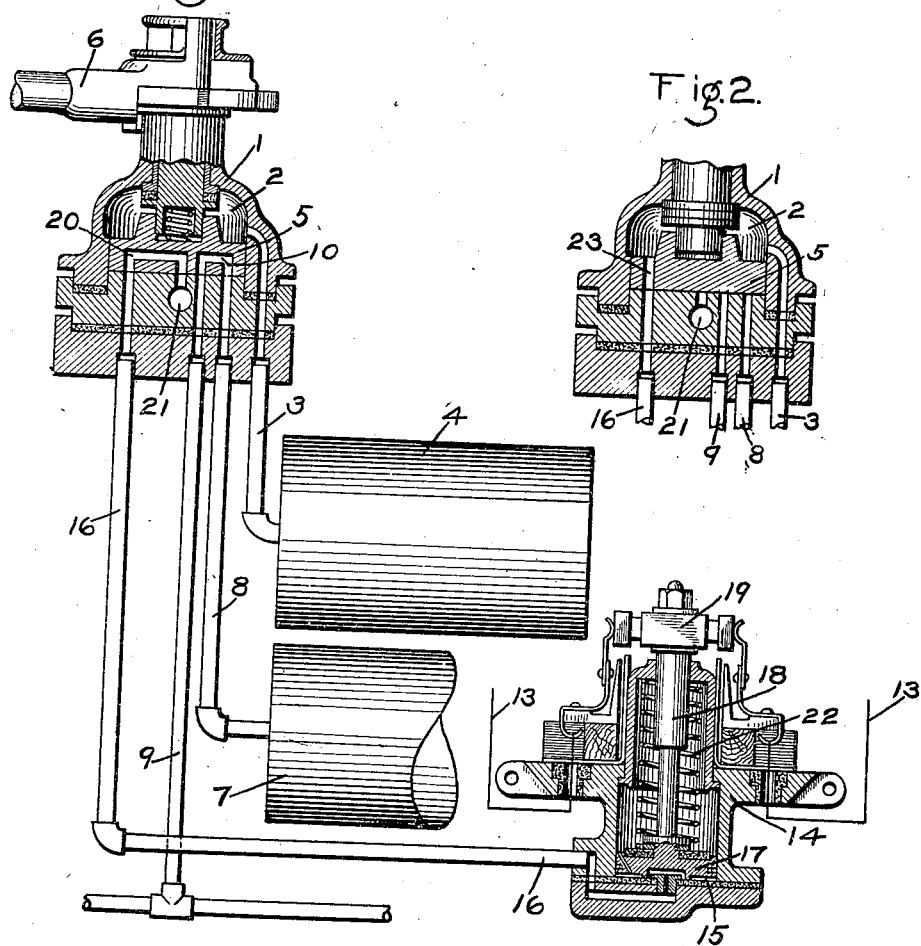
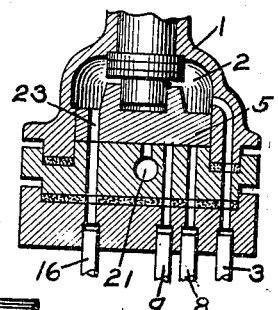
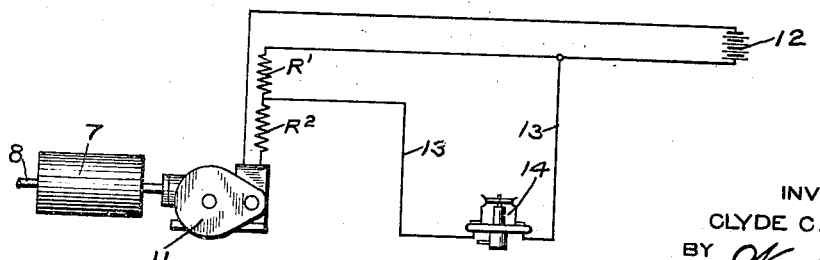
INVENTOR
CLYDE C. FARMER
BY *Wm. M. Cady*
ATTORNEY Patented Dec. 11, 1923.

1,477,215

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SPEED-GOVERNING-SWITCH DEVICE.

Application filed February 7, 1921. Serial No. 442,941.

*To all whom it may concern:*

Be it known that I, CLYDE C. FARMER, a citizen of the United States, residing at Edgewood, in the county of Allegheny and State of Pennsylvania, have invented new and useful Improvements in Speed-Governing-Switch Devices, of which the following is a specification.

This invention relates to regulating devices for fluid exhausting or compressing pumps, and more particularly as applied in connection with a fluid controlled brake system.

Reference is made more particularly to the so-called vacuum brake system where there is provided a vacuum brake pipe in which a partial vacuum is normally maintained and means operated upon admitting fluid from the atmosphere to the vacuum pipe for effecting an application of the brakes.

The partial vacuum in the brake pipe is maintained by connecting same to a reservoir in which a partial vacuum is maintained by the operation of a pump or exhauster.

In the operation of a vacuum brake, when the brake valve is turned to release position for releasing the brakes, a greater capacity for exhausting fluid from the brake pipe is desirable than in other positions, since in applying the brakes, fluid is admitted from the atmosphere to the brake pipe, and this fluid must be promptly and quickly exhausted from the brake pipe in release position to secure the prompt release of the brakes throughout the train.

The principal object of my invention is to provide means operated upon movement of the brake valve to release position for securing a more rapid exhaust of fluid from the vacuum reservoir and consequently from the vacuum brake pipe.

For accomplishing the above object, I preferably provide a pump or exhauster operated by an electric motor and means operated in the release position of the brake valve for cutting resistance out of the motor circuit, so that the motor speed will be increased and thereby the pump will be operated at a higher rate.

In the accompanying drawing; Fig. 1 is a diagrammatic view of an apparatus embodying my invention, and including a vacuum reservoir, and a brake valve device and fluid operated switch device in section; Fig. 2 a sectional view of the brake valve device in a position other than release position; and Fig. 3 a wiring diagram, showing the arrangement of the electric wiring.

The apparatus shown in Fig. 1 comprises a brake valve device 1 having a valve chamber 2 connected by a pipe 3 with a main reservoir 4 and containing a rotary slide valve 5 for controlling the application and release of the vacuum brakes, the valve 5 being operated by a handle 6.

A vacuum reservoir 7 in which a partial vacuum is maintained, is connected to the seat of valve 5 by a pipe 8, and in release position, the pipe 8 is connected to the vacuum brake pipe 9 by a cavity 10.

The partial vacuum in the reservoir 7 is maintained by a motor driven pump 11, as shown in Fig. 3, the circuit of the pump motor being connected through resistances $R^1$ and $R^2$ with a source of current 12.

According to my invention, a short circuit wire 13 is provided around the resistance $R^2$ and this circuit is controlled by a switch device 14 comprising a casing having a piston chamber 15 connected by a pipe 16 to the seat of the rotary valve 5 and containing a piston 17.

The stem 18 of the piston 17 carries a contact member 19 adapted to close the circuit through the wire 13.

In release position of the brake valve 1, pipe 16 is connected by cavity 20 with an exhaust port 21, so that fluid is vented from piston chamber 15 of the switch device 14, permitting the spring 22 to move the piston 17 so as to close the circuit through the short circuit wire 13.

In all other positions of the brake valve, as shown in Fig. 2, the pipe 16 is connected by a port 23 through the rotary valve 5 with the valve chamber 2, so that fluid under pressure from the reservoir 4 is supplied to piston chamber 15 and the piston 17 is therefore operated by fluid pressure to maintain the circuit open.

It will now be seen that in positions of the brake valve other than release, the circuit of the pump motor includes both resistances $R^1$ and $R^2$ and the motor then runs at a normal speed for operating the pump, which is ample to maintain a partial vacuum in the vacuum reservoir 7.

Upon movement of the brake valve to release position, however, fluid is vented from the switch piston 17, so that a short circuit around the resistance $R^1$ is closed, and the pump motor therefore runs at a higher rate of speed, causing the pump to operate faster and thereby fluid is more rapidly exhausted from the vacuum reservoir 7 and the vacuum brake pipe 9.

Having now described my invention, what I claim as new and desire to secure by Letters Patent, is:—

1. In a fluid operated brake system, the combination with a brake valve device for controlling the brakes, of a fluid pump for the brake system and means operated in the release position of the brake valve device for causing the pump to operate at high speed.

2. In a vacuum brake system, the combination with a brake valve device for controlling the vacuum brakes and having a release position, of a vacuum reservoir, a pump for exhausting fluid from said reservoir, and means operated upon movement of the brake valve device to release position for causing the pump to operate at high speed.

3. The combination with a reservoir, of a pump for exhausting fluid from said reservoir, an electric motor for operating said pump, a resistance adapted to be cut into the motor circuit to reduce the running speed of the motor, and manually operated means for cutting said resistance into and out of the motor circuit, said means having a normal position in which said resistance is cut into the motor circuit and another position in which the resistance is cut out of the circuit while the motor is running to thereby speed up the motor.

4. In a vacuum brake system, the combination with a brake valve device having a release position, of a reservoir, a pump for exhausting fluid from said reservoir, an electric motor for operating said pump, a resistance in the motor circuit, and a switch device operated upon movement of the brake valve to release position for cutting said resistance out of the motor circuit.

5. In a vacuum brake system, the combination with a reservoir, of a pump for exhausting fluid from said reservoir, an electric motor for operating said pump, a resistance in the motor circuit, a switch for controlling a short circuit around said resistance, a piston for operating said switch, and a brake valve device having one position for supplying fluid under pressure to said piston and another position for venting fluid from said piston.

6. In a vacuum brake system, the combination with a reservoir, of a pump for exhausting fluid from said reservoir, an electric motor for operating said pump, a resistance in the motor circuit, a switch for controlling a short circuit around said resistance, a piston for operating said switch, and a brake valve device having a release position in which fluid is vented from said piston and adapted in other positions to supply fluid under pressure to said piston.

In testimony whereof I have hereunto set my hand.

CLYDE C. FARMER.